United States Patent
Zhang et al.

(10) Patent No.: US 6,418,133 B1
(45) Date of Patent: Jul. 9, 2002

(54) CODE-MODULATED TRANSMISSION PROCESS AND TRANSMISSION SYSTEM OPERATING ACCORDING THERETO

(75) Inventors: Zhongping Zhang, München (DE); Franz Seifert, Vienna (AT); Robert Weigel, München (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/101,548

(22) PCT Filed: Jan. 30, 1997

(86) PCT No.: PCT/DE97/00179

§ 371 (c)(1),
(2), (4) Date: Jul. 10, 1998

(87) PCT Pub. No.: WO97/28617

PCT Pub. Date: Aug. 7, 1997

(30) Foreign Application Priority Data

Jan. 31, 1996 (DE) .......................................... 196 03 443

(51) Int. Cl.[7] .............................................. H04B 7/216
(52) U.S. Cl. ...................... 370/342; 370/320; 370/335; 370/341
(58) Field of Search ................................. 370/342, 320, 370/335, 441; 375/140, 141, 143, 144, 148, 150, 152, 343

(56) References Cited

U.S. PATENT DOCUMENTS 3,772,597 A * 11/1973 Stover .......................... 375/242
4,053,836 A * 10/1977 Fellrath ........................ 375/327
6,144,324 A * 11/2000 Sasaki .......................... 341/94

* cited by examiner

*Primary Examiner*—Wellington Chin
*Assistant Examiner*—Brenda H. Pham
(74) *Attorney, Agent, or Firm*—Schiff Hardin & Waite

(57) ABSTRACT

This transmission method serves to transmit information between a base station (BS) and a multiplicity of subscriber stations (MS) in transmission channels of a broadband signal. The transmission channels can be distinguished by different codes ($C_s$, $C_1$, ..., $C_q$) which modulate the broadband signal and which themselves are each modulated by the information to be transmitted in the respective transmission channel and are superimposed in the broadband signal. In this context, there is provision for at least one of the transmission channels (for example $C_s$) to be emphasized, as a prioritized transmission channel, in comparison with the other transmission channels ($C_1$, ..., $C_q$), in that its phase angle is shifted by a fixed amount in comparison with the phase angle of the other transmission channels.

7 Claims, 3 Drawing Sheets

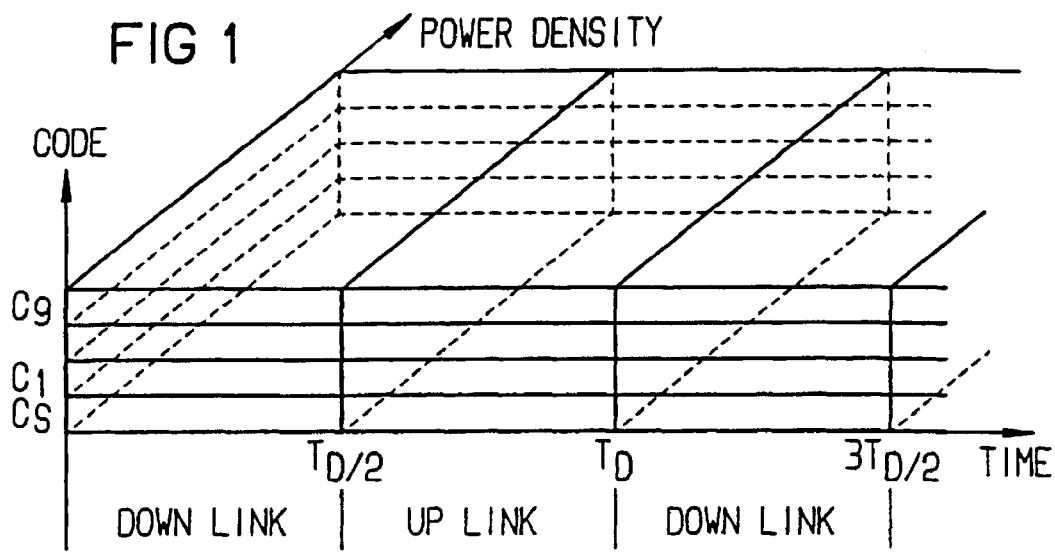
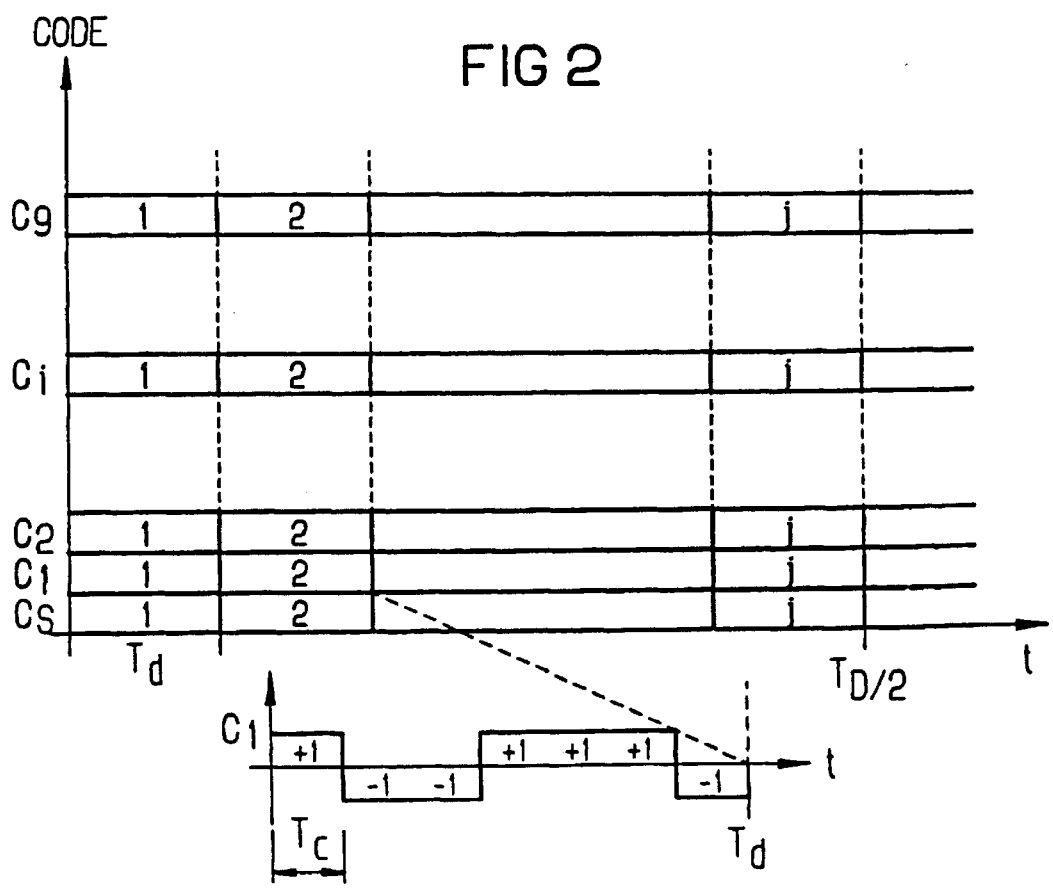

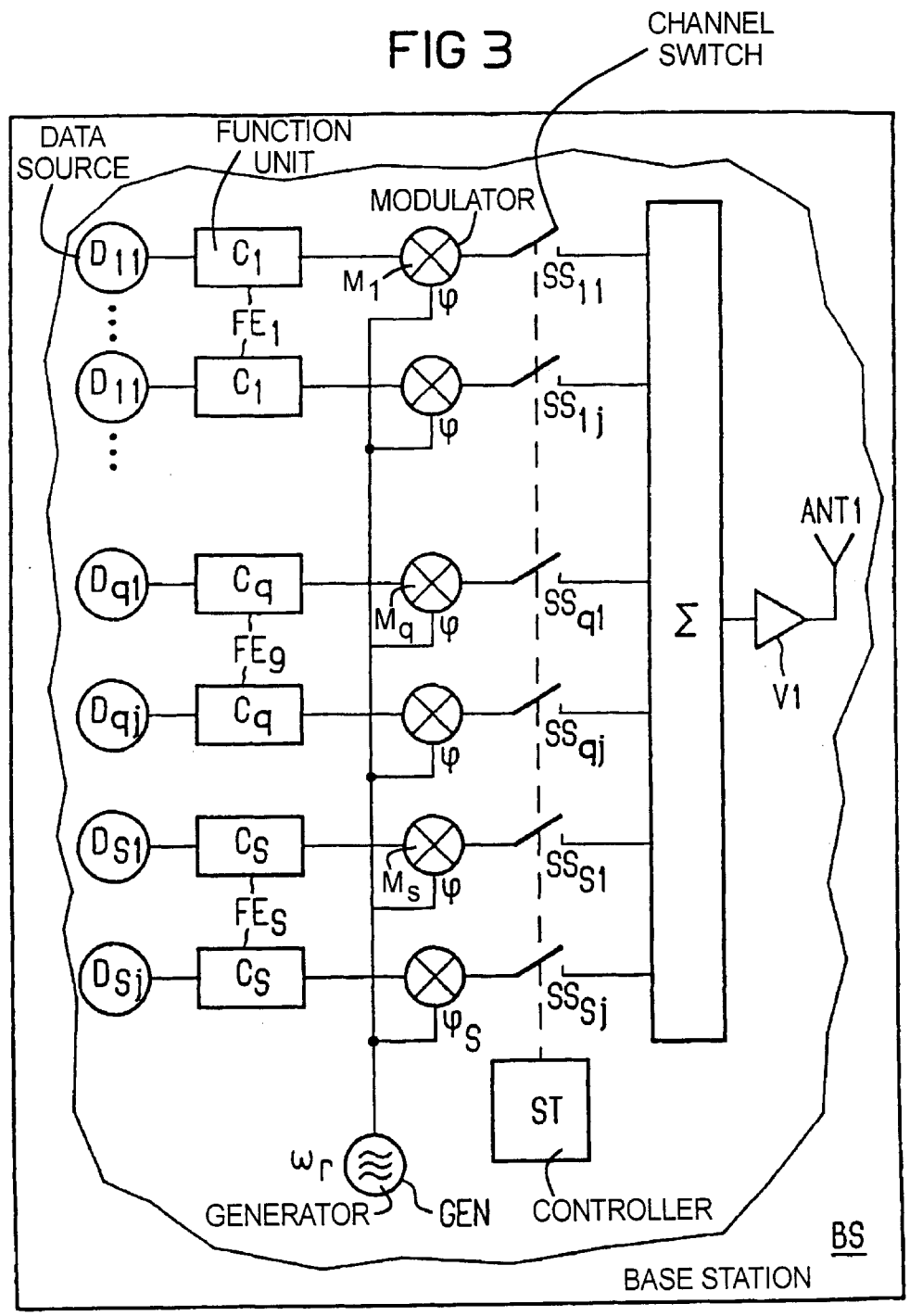

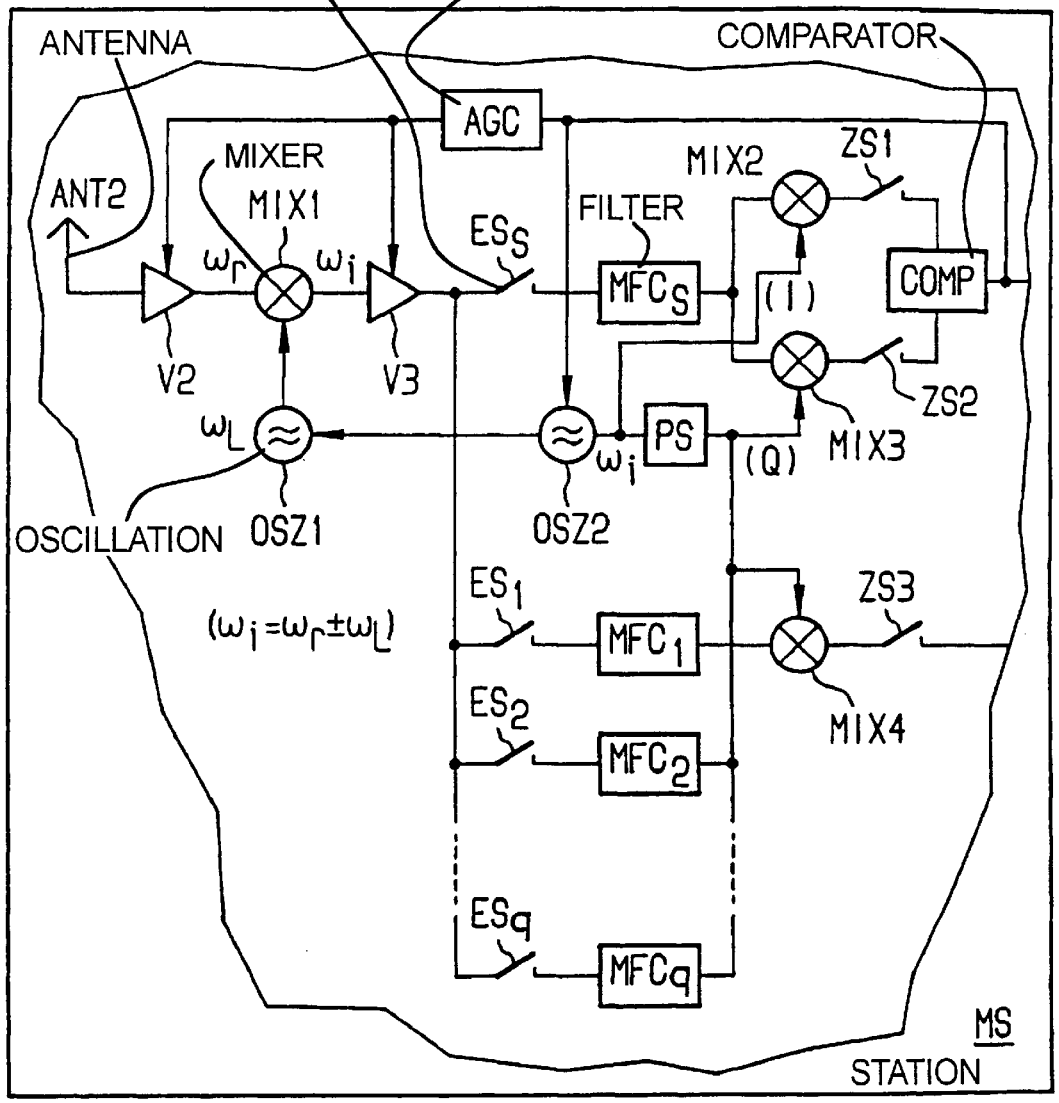

CODE-MODULATED TRANSMISSION PROCESS AND TRANSMISSION SYSTEM OPERATING ACCORDING THERETO

BACKGROUND OF THE INVENTION

The invention relates to a code-modulated transmission method and a transmission system.

A transmission system operating according to the code-modulated transmission method (CDMA) (Code Division Multiple Access) constitutes a telecommunications system in which a radio field is used jointly by a number of subscribers. The telecommunications system comprises fixed or mobile subscriber stations which are connected to a base station. In this context, the subscribers can communicate with one another via the base station. For this purpose, transmission channels are provided which, in the case of the CDMA method, as already described in German reference DE 4 333 396 A1, can be distinguished from one another by means of channel-specific encoding of the useful information to be respectively transmitted in these telecommunications channels. The channel-specific encoding takes place here at the transmit end, for example in the case of a transmission from the base station to the subscriber stations (also designated below as "downlink" transmission), in such a way that each useful information bit to be transmitted in a specific transmission channel is itself divided into a fixed number of bits designated as chips ("sub bits"). The chip sequence formed by this number of chips constitutes here a chip sequence which is characteristic of the respective transmission channel. Using the codes formed in this way for the individual transmission channels, a radio-frequency carrier signal is then modulated so that the individual codes are superimposed in this modulated carrier signal.

At the receive end, i.e. in the individual subscriber stations in the assumed example, the transmission channel, and thus code, which is appropriate for the respective subscriber station is initially selected from the received radio-frequency carrier signal by demodulation and filtering, and finally the useful information transmitted in the said transmission channel is recovered from it.

In the case of the CDMA method, the bandwidth of the useful information to be transmitted is to a greater extent widened as a result of the previously described encoding of said information. In this context, mention is also made of a "spread spectrum" transmission method. Here, the entire frequency band available is exploited for the transmission of the useful information.

In the case of a modified CDMA method, namely the TCDMA method, which constitutes a combination of the CDMA method and the known TDMA method "Time Division Multiple Access"), a fixed number of time slots is fixed for each code, and thus transmission channel, so that, in time division multiplex mode, each code can be utilized by a plurality of subscribers.

European reference EP-A-430587 also discloses a transmission system working according to a code-modulated transmission method, whereby the transmission channels are represented by a plurality of radio-frequency carrier oscillations modulated by codes and the phases of the radio-frequency carrier oscillations modulated by codes are synchronous.

SUMMARY OF THE INVENTION

The object of the present invention is to provide a code-modulated transmission method in order to be able to detect, at the receive end, fixed transmission channels with specific codes in relation to other codes/transmission slots with a higher degree of reliability.

In general terms the present invention is a code-modulated transmission method for transmitting information between a base station and a multiplicity of subscriber stations in transmission channels that are represented by radio-frequency carrier oscillations differently modulated by codes. At least one of the transmission channels is emphasized, as a prioritized transmission channel, in comparison with the other transmission channels in that the phase of the radio-frequency carrier oscillations modulated by the code of the prioritized transmission channels is shifted by a fixed amount compared to the phase of the radio-frequency carrier oscillations modulated by the codes of the other transmission channels.

Advantageous developments of the present invention are as follows.

The phase shift equals 90°.

In the respective transmission channel represented by a code a multiplicity of time slots is fixed for a time division multiplex transmission of different information.

A synchronization channel which is provided for the transmission of synchronization information is selected as prioritized transmission channel.

The code which represents the prioritized transmission channel is transmitted with a higher level of energy in comparison with the codes which represent the other transmission channels.

The difference between the energy of the code which represents the prioritized transmission channel and the energy of the codes which represent the other transmission channels is 1 dB.

The present invention is also a transmission system operating according to a code-modulated transmission method for transmitting information between a base station and a multiplicity of subscriber stations in transmission channels that are represented by radio-frequency carrier oscillations differently modulated by codes. The base station is constructed such that at least one of the transmission channels is emphasized by the station, as a prioritized transmission channel, in comparison with the other transmission channels, in that the phase of the radio-frequency carrier oscillations modulated by the code of the prioritized transmission channels is shifted by a fixed amount compared to the phase of the radio-frequency carrier oscillations modulated by the codes of the other transmission channels. The subscriber stations each have detection means which are constructed such that they detect initially at least some of the codes in accordance with the phase angle, and the information transmitted is then recovered from the respective code.

The invention provides here the advantage that the respective prioritized code, and thus transmission channel, can be detected in relation to the other codes in a subscriber station with a relatively low additional control expenditure.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 1 shows a diagram for a general explanation of the synchronous CDMA method, FIG. 2 shows a diagram for the explanation of the time slots fixed in the TCDMA method for the individual codes, FIG. 3 shows, in schematic form, a possible design of a base station, and FIG. 4 shows, in schematic form, a possible design of a subscriber station.

DESCRIPTION OF THE PREFERRED EMBODIMENTS

The present invention is explained below using the example of the TCDMA method. However, it is to be noted here that the present invention is not restricted to such a TCDMA method, but can also be applied with the previously mentioned CDMA method.

FIG. 1 illustrates once more the principle of the synchronous CDMA method in schematic form. According to this method, the radio link between a base station and the subscriber stations is alternately used, in time division multiplex mode, for the transmission from the base station to the subscriber stations and for the transmission from the subscriber stations to the base station. The first-mentioned transmission direction is designated here in FIG. 1 as "downlink" and the last-mentioned transmission direction is designated on the other hand as "uplink". In a time interval 0 to $T_D$ (illustrated in FIG. 1), a subinterval 0 to $T_D/2$, by way of example, is reserved here for "downlink". The remaining subinterval $T_D/2$ to $T_D$ is, on the other hand, available for "uplink".

As already mentioned at the beginning, the transmission of useful information takes place in transmission channels which, in the case of the CDMA method, are defined by codes. Using these codes, which are themselves modulated with the useful information to be transmitted, a modulation of a radio-frequency carrier signal, which is broadcast via an antenna, takes place. These codes are designated in FIG. 1 by $C_s$, $C_1$, $C_2$, ..., $C_q$. Here, the code $C_s$ represents a transmission channel in which at least synchronization information is transmitted in the form of a fixed synchronization pattern. The other codes are utilized to transmit useful data. Here, it is to be noted that useful data is to be understood to be any type of digital signal. These include for example text signals and data signals, voice signals in digital form, digital video signals etc.

FIG. 2 illustrates the case in which a fixed number of time slots is defined in accordance with the TCDMA method, already mentioned at the beginning, for each of the codes given schematically in FIG. 1. In each case one channel is assigned to these time slots in successive frames. Such a frame is illustrated in FIG. 3 and has, for example, channels which are designated by 1 to j and which are individually assigned to time slots 1 to j. The chronological length $T_d$ of such a channel corresponds here for example to the length of a useful bit, or synchronization bit, which is to be transmitted.

Furthermore, FIG. 2 shows, using the example of $C_1$, that the respective code is formed from a chip sequence (bit sequence) which characterizes the said code and has a fixed number of chips whose length is in each case $T_c$ and whose logic level may be for example +1 or −1. The length of the chip sequence, for example 7 chips, corresponds here to the length of a channel $T_d$, and thus of a bit to be transmitted.

The explained division into channels applies likewise to the "uplink" transmission direction ($T_D/2$ to $T_D$).

Since the TCDMA method has been described previously in general terms with reference to FIGS. 1 and 2, more details are given below on a possible design and the method of operation of a base station and of the subscriber stations which have a radio link thereto for a "downlink" transmission.

In this context, the base station is initially considered with reference to FIG. 3, only those circuit elements of the former which are necessary for comprehension of the present invention being shown.

For the following explanations it will be assumed that there are to be transmitted continuously from the base station BS to all the subscriber stations, for example in the form of mobile stations, on the one hand useful data relating to a multiplicity of transmission channels i (i=1, ..., q) with the codes $C_i$ (i=1, ..., q) and, on the other hand, an item of fixed synchronization information in a separate transmission channel S with the code $C_s$, and that the transmission is to be specifically according to the TCDMA method. Since, as already mentioned, according to this TCDMA method a fixed number of time slots (j) is provided for each code, the individual codes are each used for a transmission to a multiplicity of subscriber stations. In each case a separate data source, which sources make available the useful data and the synchronization information in the form of bits, is indicated schematically for the useful data and the synchronization information which may constitute binary information with the logic levels "1" and "0". These data sources are designated in FIG. 3 by D11, ..., D1j; ...; Dq1, ..., Dqj; Ds1, ..., Dsj according to their assignment to the transmission channels 1 to q, S and to the time slots (j) respectively fixed for them. Each of these data sources has connected downstream of it a separate modulation branch which is assigned to one of the transmission channels 1 to q and S and to one of the time slots respectively fixed in the said transmission channels 1 to q and S. In the respective modulation branch, the relevant code ($C_1$, ..., $C_q$, $C_s$) provided by a function unit (FE1, ..., FEq, FEs) for the respective transmission channel is initially modulated with the useful data bit or synchronization bit which has just been made available. For this, the OOK modulation method ("ON-OFF-Keying") is used, i.e. in which, for example, when a logic level "1" which is to be transmitted occurs the respective code is emitted and when a logic level "0" occurs the code is, on the other hand, suppressed.

Then, the respective modulated code is fed to a modulator ($M_1$, ..., $M_q$ and $M_s$) located in the respective modulation branch, in order to modulate, with this code, a radio-frequency carrier wave whose angular frequency is $\omega_r = 2\pi f_r$ and which is made available by a radio-frequency generator GEN. So-called binary phase modulation BPSK ("Binary Phase Shift Keying") is used for this. The modulators are constructed in the present exemplary embodiment in such a way that the phase of at least one of the radio-frequency carrier waves which is modulated by means of a code is shifted by a fixed amount in comparison with the phase of the other radio-frequency carrier waves modulated by means of codes. The phase shift is, for example, 90° here, the phases of the aforesaid other radio-frequency carrier waves being at least approximately the same. The modulators have, for example, appropriate phase shifters or delay elements for this. In the present exemplary embodiment, the radio-frequency carrier wave which is modulated with the code $C_s$ has the phase shift so that the transmission channel represented by this code is emphasized or prioritized over the other transmission channels, in order to facilitate the synchronization, which is normally considered to be difficult in CDMA systems.

Moreover, there is provision in the present exemplary embodiment for the prioritized code (here $C_s$) to be emitted with a higher level of energy than the other codes, for example with a level of energy which is higher by 1 dB.

Furthermore, at least one further code may also be alternatively or additionally prioritized in the given way in order to increase the security of detection of the said code in comparison with the other codes. An example of this is a code which represents a transmission channel which is utilized for example as an emergency call transmission channel.

The modulated radio-frequency carrier signals which are produced in the individual modulation branches in this way are then fed in each case to a channel switch which is associated with the respective modulation branch and which is controlled from a control device ST in such a way that the modulated radio-frequency carrier signal is fed, in accordance with the TCDMA method and in the appropriate channels, to a summing device $\Sigma$ connected to the outputs of the channel switches. In FIG. 3, the channel switches are designated by $SS_{11}, \ldots, SS_{1j}; SS_{q1}, \ldots, SS_{qj}; SS_{s1}, \ldots, SS_{sj}$ according to their assignment to the individual modulation branches.

The individual modulated radio-frequency carrier signals, which are of identical frequency, are super-imposed by the aforesaid summing device $\Sigma$. The radio-frequency carrier signal resulting from this super-imposition is then broadcast via an antenna ANT1 after amplification by an amplifier V1.

Furthermore, it is also to be noted with respect to the use of the codes and the time slots that there is no fixed assignment provided for the latter to specific subscriber stations. Instead, the allocation of the codes and channels to the individual subscriber stations is carried out by the base station BS. For this, there may be, for example, a table in the said base station BS, which table indicates the codes and time slots which are already active and those which are still free. In accordance with the information contained in this table, the base station BS selects the codes and channels to be utilized for the connections to the individual subscriber stations and communicates the said codes and channels to the subscriber stations, for example by means of information transmitted in fixed time slots of the synchronization channel ($C_s$). For this selection, for example the time slots of a code may, in this context, be initially occupied as uniformly as possible before a further code is selected, the selection of the time slots and codes being carried out in such a way that interference between information to be transmitted in the same time slot is avoided. Further details on the selection of the codes and time slots is not given below, since this is not the subject-matter of the present invention.

The modulated radio-frequency carrier wave broadcast via the antenna ANT1 is received by the individual subscriber stations connected to the base station BS. Further details on the reception procedures are given below. For this purpose, it will be assumed that the possible structure of the subscriber stations is as illustrated in FIG. 4. In this context, only those circuit elements are given which are necessary for comprehension of the present invention.

According to FIG. 4, the modulated radio-frequency carrier signal received by a subscriber device designated by MF passes via an antenna ANT2 to an amplifier V2 which is controlled to cover a large dynamic range of the reception field strength (near/distant) (AGC, "Automatic Gain Control"). The amplified carrier signal ($\omega_r$) is mixed in a first mixing stage MIX1 with an oscillator signal, made available by an oscillator OSZ1, with the frequency $\omega_L$, in such a way that a signal with an intermediate frequency $\omega_i$, where $\omega_i = \omega_r \pm \omega_L$, is produced. After amplification by a likewise controlled intermediate-frequency amplifier V3, the intermediate-frequency signal is fed, on the one hand, to a channel switch $ES_s$ and, on the other hand, to channel switches $ES_1$ to $ES_q$. These switches each form the input of a separate filter branch for filtering the previously mentioned codes $C_s$ and $C_1$ to $C_q$ for the synchronization information and useful data. In this regard, it is assumed in the present exemplary embodiment that the respective subscriber station MS is configured to receive all the codes. However, as an alternative, the respective subscriber station may also be configured to receive only one of the codes $C_1$ to $C_q$, or a number thereof, and the code $C_s$. In this case, only the relevant switches, and thus filter branches, would then be provided.

The channel switch $ES_s$, is closed during the above-mentioned time interval (illustrated in FIG. 1) for the "downlink" transmission ($T_D/2-T_D$) to each channel. On the other hand, of the channel switches $ES_1$ to $ES_q$, only the one which corresponds to the code and channel allocated to the subscriber station MS by the base station BS (FIG. 3) is closed.

Connected downstream of the channel switches $ES_s$, and $ES_1$ to $ES_q$ is in each case a signal-matched filter which is tuned to one of the codes $C_s$ and $C_1$ to $C_q$. These filters, which are designated by $MFC_s, MFC_1, \ldots, MFC_q$ according to the assignment to the individual switches, and thus filter branches, may be constructed for example as so-called "matched filter" arrangements as described in the German reference DE 4 333 396 A1 mentioned at the beginning, or in "A SAW Matched Filter Spread Spectrum Technique Based for Indoor Multiple Access Systems", Z. Zhang, F. Seifert, R. Weigel, Proceedings 1995 IEEE MTT-S Symposium, Orlando, May 1995, pages 899 to 902.

The output of the filter $MFC_s$, to which an intermediate-frequency signal with the intermediate frequency $\omega_i$ is fed when the channel switch $ES_s$ is closed, supplies an output signal in the form of a compressed output pulse during the occurrence of a synchronization bit, and thus of the code $C_s$. This output signal is fed to two mixers MIX2 and MIX3. In addition, the mixer MIX2 (I branch) is supplied with an oscillation signal with the intermediate frequency $\omega_i$ from an oscillator OSZ2. On the other hand, the mixer MIX3 (Q branch) has fed to it an oscillation signal which has the same intermediate frequency but whose phase is shifted by $\pi/2$. For this purpose, in the present exemplary embodiment, a phase shifter, designated by PS, is connected between the oscillator OSZ2 and the mixer MIX3. At the output end, the two mixers MIX2 and MIX3 are each connected to a comparator COMP via a time-window switch. Here, the time-window switch assigned to the mixer MIX2 is designated by ZS1 and, on the other hand, the time-window switch assigned to the mixer MIX3 is designated by ZS2. The two time-window switches are controlled jointly here. Coherent detection of the synchronization signals then takes place downstream of the comparator COMP.

Moreover, the comparator COMP is connected by its output, on the one hand to a control input of the oscillator OSZ2 in order to control its frequency and phase, and on the other hand to a control input of a device AGC in order to control the amplification of the previously mentioned amplifiers V2 and V3.

The circuit elements MIX2, MIX3 and COMP, just described and connected downstream of the filter $MFC_s$, constitute a so-called "Costas Loop". It is used to convert to baseband the output signal occurring at the output of this signal by mixing at the phase angle 0 (I branch) and $\pi/2$ (Q branch), and the relevant synchronization bit is acquired, specifically for example by means of an (adaptive) threshold value decision. If, in this context, the phase angle of the output signal occurring in the I branch corresponds to the phase angle at which the radio-frequency carrier signal modulated with the code $C_s$ is broadcast from the base station BS (FIG. 3) and received in the subscriber station MS, the frequency $\omega_i$ and the phase of the oscillation signal emitted by the oscillator OSZ2 are controlled by the comparator COMP of the "Costas Loop" (AFC, "Automatic Frequency Control"), in such a way that a maximum of the previously mentioned output pulse of the filter $MFC_s$ (or a maximum of the signal energy) arises in the I branch of the filter $MFC_s$ during a time window $F_s$, while, on the other hand, a minimum of the output pulse occurs in the Q branch of the filter $MFC_s$. The time window $F_s$, which is determined by the closed time of the time-window switches ZS1 and ZS2, in this context initially remains open before synchronization until the synchronous clock $T_p$ and the period of the channels ($T_d$ in FIG. 2) have been found in the subscriber station MS by observing the signal peaks in the I branch and Q branch of the filter $MFC_s$. Only after synchronization do the time-window switches ZS1 and ZS2 begin to perform their error-reducing function as a result of shortening of the time window to the value $F_s$. The value $F_s$ is determined here in such a way that interference faults as a result of different codes being active in the same channel are avoided.

The other, above-mentioned, filters $MFC_1$ to $MFC_q$ are jointly connected by their outputs to a mixer MIX4. Since only one of these channel switches ES1 to ESq associated with these filters is closed in each case, the output pulse occurring at the output of the filter connected to the channel switch which has just been closed is fed to the mixer MIX4. Moreover, the latter is supplied with the oscillation signal, made available for the above-mentioned Q branch of the filter $MFC_s$, of the oscillator OSZ2 with the frequency $\omega_i$, which signal is phase-shifted by 90°, i.e. by $\pi/2$, in comparison with the oscillation signal for the I branch of the filter $MFC_s$. As a result of the coherent detection of the codes $C_1$ to $C_q$ with the Q phase angle of the oscillation signal $\omega_i$ which takes place, a maximum of the currently occurring data pulse is obtained at the output of the mixer MIX4 in the frequency-controlled and phase-controlled state of the subscriber station MS when the channel switch (ES1 to ESq) is closed. In order also to avoid a fault here as a result of signals transmitted when different codes are active in the same channel, the mixer MIX4 has connected downstream of it a time-window switch ZS3, whose closed state determines a time window $F_x$ within the respective channel. Downstream of this time-window switch, the relevant data bit is then derived by means of an (adaptive) threshold decision.

In order to determine the parameters of the time-window width $l_{w1}$ and $l_{w2}$, which respectively constitute the starting value ($l_{w1}$) and the final value ($l_{w2}$) of the time windows $F_s$ and $F_x$ ($F_s=l_{w2}-l_{w1}$; $F_x=l_{w2}-l_{w1}$) within a channel $T_d$, the radio channel pulse response at the air interface between the base station BS and the subscriber stations MS is taken into account at the respective filter $MFC_s$, $MFC_1$, ..., $MFC_q$. The channel pulse response is given by $$h(t) = \sum_{k=1}^{K} a_k \cdot \delta(t - t_k) \cdot e^{j\theta_k}$$

where K specifies the path number of the multipath propagation of the radio signal, i.e. the number of different paths as a result of reflections (echoes). The other parameters $\{a_k\}$, $\{t_k\}$ and $\{\theta_k\}$ represent the amplitude damping, the relative propagation time and the corresponding phase change. This channel pulse response therefore takes into account the fact that, as a result of the individual reflections, not only a main maximum but also secondary maxima occur.

The time-window variables $l_{w1}$ and $l_{w2}$ are defined by:

$$l_{w1}=\lfloor \max\{\tau_{\textit{diff}}\} \rfloor \text{ and } l_{w2}=\lfloor \max\{\tau_{rms}\} \rfloor,$$

where $\lfloor x \rfloor$ is the integer part of x. The parameter $\tau_{\textit{diff}}$ here represents the difference between the time delays of the subscriber stations MS owing to their different positions in relation to the base station BS (FIG. 3). $l_{w1}=0$ applies to a "downlink" transmission, since the signals arrive in the respective subscriber station MS without differences in propagation time. In the "uplink" transmission direction, when more than one subscriber station is active in the same channel $l^{w1}$ is normally unequal to "0" owing to the different positions.

The parameter $\tau_{rms}$ represents the so-called "random mean square delay spread" and is obtained as:

$$\tau_{rms} = \sqrt{\frac{\sum_{k=1}^{K}(t_k - \tau_m)^2 a_k^2}{\sum_{k=1}^{K} a_k^2}} \text{ with } \tau_m = \frac{\sum_{k=1}^{K} t_k a_k^2}{\sum_{k=1}^{K} a_k^2}.$$

As a result, not only the propagation time delays but also the energy components of the individual paths are included in the determination of the time window width.

This results in optimum combining of the echo signals for the data detection and at the same time a maximum elimination of interference outside the determined time windows $F_s$ and $F_x$.

In order to be able to receive the synchronization bits with a relatively low bit error rate, a particular method for selecting the spread codes ($C_1$ to $C_q$) is used in addition to the time-window procedure at the output of the filter $MFC_s$. The spread codes which are found in this way have very good cross-correlation properties in relation to the synchronization code $C_s$, so that the multiple access interference, caused by the data codes $C_i$ (i=1, . . . ,q), in the same channel can be minimized.

Codes with absolute orthogonalities in the entire correlation range, for example Walsh codes, are only available in a very limited number and are therefore not well suited to code multiplexing. Gold codes are a family of pseudo-noise codes with relatively small cross-correlations. A large number of Gold codes are available, only certain codes having good cross-correlation properties, however. Gold codes can be generated using so-called preferred pairs of m sequences ("maximum length linear sequences").

Owing to the time-window procedure at the output of the filter $MFC_s$, spread codes which have the smallest possible cross-correlation values within the time window $F_s$ are required. As a result, considerably less is demanded in terms of the orthogonality of the spread codes in comparison with the orthogonality in the entire correlation range. Therefore, it is possible to find numerous suitable spread codes for a TCDMA application.

A selection of the spread codes is explained below. The time-window function will be defined as follows:

$$\Gamma = [\,\Gamma(1)\ \ \Gamma(2)\ \ \ldots\ \ \Gamma(2L-1)\,]$$

$$\Gamma(l) = \begin{cases} 1 & l \in \{L - l_{w1}, L - l_{w1} + 1, \ldots, L, L+1, \ldots, L + l_{w2}\}. \\ 0 & \text{else} \end{cases}$$

L is the length of the spread codes and $l_{w1}, l_{w2}$ are, respectively, the above-mentioned starting and final indices of the time window for output sampling at the signal-matched filter $MFC_s$.

For spreading the synchronous bits, it is possible to use for example the previously already mentioned m sequences, owing to their good auto-correlation properties. The spread codes for the useful data can be selected from the numerous Gold codes $C_i$, i=1, . . . ,$N_s$, with the same length L.

Owing to the on-off keying modulation, only an aperiodic correlation function is taken into account here for the selection of the spread codes. The aperiodic correlation of two codes $C_s$ and $C_1^{(n)}$, where $C_1^{(n)}$ is the version of $C_1$ which is shifted cyclically by n chips, is defined according to:

$$\underline{\psi} = [\,\psi(1)\ \ \psi(2)\ \ \ldots\ \ \psi(2L-1)\,] \qquad (1)$$

$$\psi(l) = \sum_{\kappa=1}^{L} C_s(\kappa) C_1^{(n)}(l + \kappa) \text{ for } l = 1, \ldots, 2L-1$$

The window value for $c_1^{(n)}$ is obtained from $$F_1(n) = \Sigma \underline{\psi} \cdot \underline{\Gamma}$$

For $C_1$, a maximum window value is obtained from $$M_1 = \max\{F_1(n)\} \text{ for } n=1, \ldots, L-1$$

with the corresponding index $n_1$ for M1.

If the procedure is repeated with each C1 from the code set $C_i$, i=1, . . . ,$N_s$, the result is $$\underline{M} = [M_1 M_2 \ldots M_{N_s}], \underline{n} = [n_1 n_2 \ldots n_{N_s}].$$

The shifted versions of the respective spread codes result from $$C_i^{(n_i)(l)} = C_i(l + n_i) \text{ for } n_i, l=1, \ldots, L-1 \text{ and } i=1, \ldots, N_s$$

If the vector $\underline{M}$ is sorted in ascending order $$\underline{M}' = \text{sort}(\underline{M}),$$

a new index vector $$\underline{n}' = [n'_1 n'_2 \ldots n'_{N_s}]$$

is obtained in accordance with $\underline{n}$.

Finally, the searched-for codes are obtained as $$C'_i = C_i^{(n'_i)}.$$

The codes $C'_1$ found according to this method have, in relation to the synchronization code $C_s$, the property that $C'_1$ has the lowest cross-correlation with $C_s$ and $C'_2$ has the second-lowest cross-correlation with $C_s$, etc. This method can be continued iteratively in such a way that, in the equation (1), the code $C_s$ is replaced by the sum of $C_s$ and $C'_1$ and $C_1$ is replaced by $C_2$, and the specified method steps are thus carried out. A second code, which has the lowest cross-correlation with respect to $C_s$ and $C'_1$, is then obtained. At the third iteration, the code $C_s$ is replaced in the equation (1) by the sum of the two codes already found + $C_s$ and $C_1$ to $C_3$ in order to determine a third code after the given method steps have been carried out. This method is then continued with further iterations in a corresponding way, in order to determine all the further codes.

Furthermore, the selection method just described can likewise be used to determine the data codes for an "uplink" transmission. In such a case, it is possible to use as a basis a specific code which replaces the code $C_s$ as the first code in equation (1).

The invention is not limited to the particular details of the method and apparatus depicted and other modifications and applications are contemplated. Certain other changes may be made in the above described method and apparatus without departing from the true spirit and scope of the invention herein involved. It is intended, therefore, that the subject matter in the above depiction shall be interpreted as illustrative and not in a limiting sense.

What is claimed is:

1. Code-modulated transmission method for transmitting information between a base station and a multiplicity of subscriber stations in transmission channels that are represented by radio-frequency carrier oscillations differently modulated by codes, comprising the steps of:

determining at least one of the transmission channels as a prioritized transmission channel;

shifting by a fixed amount a phase of the radio-frequency carrier oscillations modulated by the code of the at least one prioritized transmission channel as compared to a phase of the radio-frequency carrier oscillations modulated by the codes of the other transmission channels.

2. The code-modulated transmission method according to claim 1, wherein the phase shift equals 90°.

3. The code-modulated transmission method according to claim 1, wherein, in a respective transmission channel represented by a code, a multiplicity of time slots is fixed for a time division multiplex transmission of different information.

4. The code-modulated transmission method according to claim 1, wherein a synchronization channel which is provided for transmission of synchronization information is selected as the prioritized transmission channel.

5. The code-modulated transmission method according to claim 1, wherein the code which represents the prioritized transmission channel is transmitted with a higher level of energy in comparison with the codes which represent the other transmission channels.

6. The code-modulated transmission method according to claim 5, wherein a difference between energy of the code which represents the prioritized transmission channel and energy of the codes which represent the other transmission channels is 1 dB.

7. Transmission system operating according to a code-modulated transmission method for transmitting information between a base station and a multiplicity of subscriber stations in transmission channels that are represented by radio-frequency carrier oscillations differently modulated by codes, comparison:

the base station structured such that at least one of the transmission channels is emphasized by said station, as a prioritized transmission channel, in comparison with the other transmission channels, in that a phase of the radio-frequency carrier oscillations modulated by the code of the prioritized transmission channels is shifted by a fixed amount compared to a phase of the radio-frequency carrier oscillations modulated by the codes of the other transmission channels; and each of the subscriber stations having a detection structured such that at least some of the codes are detected in accordance with a phase angle, and such that information transmitted is then recovered from a respective code.

* * * * *